(12) United States Patent
Agsteiner

(10) Patent No.: US 10,163,170 B2
(45) Date of Patent: Dec. 25, 2018

(54) METHOD AND SYSTEM FOR DESIGNING A PRODUCT CONFIGURATION

(71) Applicant: SAP SE, Walldorf (DE)

(72) Inventor: Karlheinz Agsteiner, Dielheim (DE)

(73) Assignee: SAP SE, Walldorf (DE)

( * ) Notice: Subject to any disclaimer, the term of this patent is extended or adjusted under 35 U.S.C. 154(b) by 623 days.

(21) Appl. No.: 14/830,203

(22) Filed: Aug. 19, 2015

(65) Prior Publication Data
US 2017/0052682 A1 Feb. 23, 2017

(51) Int. Cl.
*G06F 8/38* (2018.01)
*G06F 8/20* (2018.01)
*G06Q 50/00* (2012.01)
*G06F 8/34* (2018.01)

(52) U.S. Cl.
CPC ............ *G06Q 50/00* (2013.01); *G06F 8/38* (2013.01); *G06F 8/24* (2013.01); *G06F 8/34* (2013.01)

(58) Field of Classification Search
CPC ..... G06F 8/24; G06F 8/34; G06F 8/35; G06F 8/38
See application file for complete search history.

(56) References Cited

U.S. PATENT DOCUMENTS

| | | | | |
|---|---|---|---|---|
| 5,537,630 A * | 7/1996 | Berry | ........................ | G06F 8/33 715/763 |
| 5,623,591 A * | 4/1997 | Cseri | ..................... | G06F 3/0481 715/209 |
| 6,433,802 B1 * | 8/2002 | Ladd | ........................ | G06F 8/34 715/762 |
| 6,636,242 B2 * | 10/2003 | Bowman-Amuah | ........................ | G06F 17/30607 715/733 |
| 7,571,390 B2 * | 8/2009 | Langkafel | ......... | G06F 17/30569 715/763 |
| 7,861,178 B2 * | 12/2010 | Lui | ....................... | G06F 9/4446 715/708 |
| 8,091,036 B1 * | 1/2012 | Pavek | ....................... | G06F 8/38 358/1.18 |
| 8,302,019 B2 * | 10/2012 | Litoiu | .................... | G06Q 10/06 715/763 |
| 9,003,318 B2 * | 4/2015 | Magnusson | ............. | G06F 8/313 715/760 |
| 2004/0187090 A1 * | 9/2004 | Meacham | ................ | G06F 8/38 717/103 |

(Continued)

*Primary Examiner* — Andrew L Tank
(74) *Attorney, Agent, or Firm* — Jones Day

(57) ABSTRACT

An authoring environment is provided by which a modeler can design a product configuration model from which a user interface is generated, the latter of which is user-interactable (or customer-interactable) for product configuration. A plurality of options offered for a particular product are definable, and states, which can correspond to respective user interface screens, for example, are definable, which refer to defined options. The modeler can use the authoring environment to associate groups of one or more previously defined options with respective ones of the defined states, for example, for population of the screens to which the states correspond with the associated group of options. The authoring environment provides for the modeler to be able to define transition rules between the defined states/screens. A modeler engine converts the model designed using the authoring environment into a product configuration usable by customers.

20 Claims, 11 Drawing Sheets

(56) References Cited

U.S. PATENT DOCUMENTS

| | | | |
|---|---|---|---|
| 2010/0050152 A1* | 2/2010 | Gilboa | G06F 8/38 |
| | | | 717/106 |
| 2010/0131869 A1* | 5/2010 | Adachi | G06F 8/00 |
| | | | 715/760 |
| 2012/0158635 A1* | 6/2012 | Van Lunteren | G06N 5/025 |
| | | | 706/48 |
| 2013/0167046 A1* | 6/2013 | Colletti | G06F 3/0484 |
| | | | 715/760 |
| 2013/0226636 A1* | 8/2013 | Hathaway | G06Q 30/02 |
| | | | 705/7.11 |

* cited by examiner

METHOD AND SYSTEM FOR DESIGNING A PRODUCT CONFIGURATION

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

Product (or service) configuration involves customizing a product with various options to satisfy needs of a particular customer. Providers of products display various features of their products to customers to assist the customers in feature and option selection for the products. Product configuration is an important function for websites by which a customizable product can be ordered.

Product configuration for simple products is an easy task, because simple products are provided with few customizable options. For example, a simple product can be a knife, where, for each model of a knife, there can be a few options from which to select to customize the knife. On the other hand, there are complex products, such motor vehicles, which can be customized using hundreds of options. For example, for each model of a motor vehicle, there are many options from which to select to customize the vehicle.

A provider of products, e.g., a vehicle seller can present all of the options, e.g., of the vehicle, on, for example, a single webpage. Thus, the customer will be presented with hundreds of options at once, which can be overwhelming and distracting to the customer. Moreover, some of the options presuppose other prerequisite options and some options can be incompatible with other options. For example, it can be the case that a red bumper can be offered only for a red vehicle while a yellow bumper can be offered only for a yellow vehicle. As a result, when a customer selects the exterior color of the vehicle, the color of the bumper should be preselected. As another example, ski racks on the roof may not be compatible with a sunroof, and thus, the customer should have to select one or the other, but presenting all of the options on a single page does not adequately address such interdependencies.

BRIEF DESCRIPTION OF THE DRAWINGS

FIG. 1 illustrates an example embodiment of designing a product configuration state including various options.

FIG. 2 illustrates an example embodiment of designing a product configuration starting state including various options.

FIG. 3 illustrates an example embodiment of designing a product configuration sub-state including various options.

DETAILED DESCRIPTION

Figure 4:
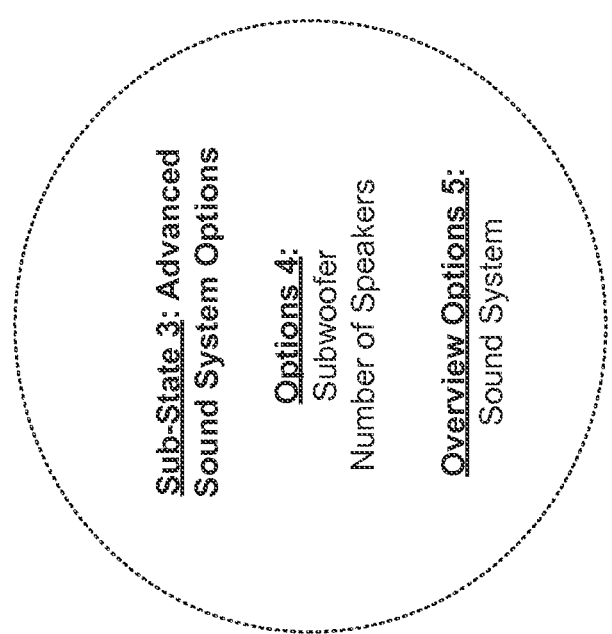
FIG. 4 illustrates an example embodiment of designing a product configuration sub-state including various options and an overview option.

A static approach to providing an interface by which to customize a product is to design a sequence of steps to present all of the options to the customer. For example, a vehicle manufacturer can present to the customer the engine information, interior designs and exterior equipment, each on a separate page or screen. The splitting of the options into categorical sections provided over a respective set of pages alleviates to some extent the problem of presenting too many options to the customer all at once; however, this approach is inflexible because all of the options which appear on each page are predetermined. As a result, the display cannot acclimate to the customer's selections. To improve flexibility, coding would be required defining the exact relationship between the options and the pages on which they appear.

While coding can improve flexibility of product configurations, coding is not amenable to change or update by modelers who are not familiar with the programming. As a result, adding a new product feature, e.g., new vehicle color, would require coding the feature into the product configuration. Thus, a programmer would have to review the source code and change it accordingly. Given numerous options for complex products and the total possibilities for defining relationships between the options and pages on which they appear, this approach can be slow, costly, and error prone.

Example embodiments of the present invention offer a more dynamic and flexible approach to product (or service) configurations. In an example embodiment, an authoring environment is provided by which a modeler can design a product configuration model from which a user interface is generated, the latter of which is user-interactable (or customer-interactable) for product configuration. The designing using the authoring environment begins with defining a plurality of options offered for a particular product, and subsequently defining states, which can correspond to respective user interface screens, for example. Then, the modeler can use the authoring environment to associate groups of one or more previously defined options with respective ones of the defined states, for example, for population of the screens to which the states correspond with the associated group of options. The authoring environment provides for the modeler to be able to define transition rules between the defined states/screens. Finally, a modeler engine converts the model designed using the authoring environment into a product configuration usable by customers.

In an example embodiment, a modeler begins designing a product configuration by defining the options that can customize a product. For example, for a vehicle, the exterior colors can be red, yellow and blue. Here, the option is the exterior color and the choices are red, yellow and blue. As another example, for a cell phone contract, a provider needs to know the starting date for the service. Thus, the starting date is an option in this case and the choices are dates. As a third example, for a cell phone manufacturer, the manufacturer can offer customers to engrave their equipment. Thus, the manufacturer can ask for a phrase with which the customers want to engrave their equipment. Here, the engraving phrase is an option for which there are no predetermined choices.

For each option, the modeler can, in an example embodiment, define an option type (or field type). The option type defines the format via which the customer (i.e., user) provides to the system information regarding an option for product configuration. A non-exhaustive list of option types includes a text box, radio buttons, dropdown list, checkbox, calendar field, or a combination thereof. The modeler can allow the customer to select one or multiple choices (when selection is offered). For example, for the exterior color option, the option type can be a radio button set with parameters that offer the customer the color options of red, yellow, and blue. Another option type can be a dropdown list which can offer similar choices to the customer. The option type can also be a text box. For example, the customer can include the exact color code of the exterior color that the customer desires in the textbox. Assuming that a vehicle can have a multi-color exterior, the modeler can allow the customer to select multiple colors for the vehicle's exterior. For example, the customer can select two choices of the radio buttons or dropdown list.

As another example, for the cell phone contract, the option type can be a calendar field. Using the field, the customer can enter the date the customer desires to start the contract. As a third example, for the cell phone manufacturer, the option type can be a textbox. By typing in the textbox, the customers can describe the phrase which the customer desires to be engraved on the customer's equipment.

After defining the options and option types, the modeler can define various states and sub-states that can correspond to screens and sub-screens to be displayed to a customer. Each state represents a step in the configuration process which will be displayed to the customer. In each screen, there can be various options and buttons. Since the modeler has defined the options already, the modeler needs only to select the options that the modeler desires to be displayed to the customer in the particular screen, for example using a drag-and-drop functionality in the authoring environment.

In addition to the options, or as an alternative to the options, the modeler can also include one or more buttons on each screen. The buttons can facilitate transition (or navigation) between various screens, sub-screens, or screens to sub-screens (or vice versa). By pressing a button, the customer can express that the customer is finished making the customer's choices on the particular screen that the customer is visiting. The buttons can also facilitate the transition by providing the customer with the choice to navigate to another screen or sub-screen before finishing selecting all of the options on the screen. The buttons can also facilitate transitions by providing a choice to navigate to optional sub-screens.

For example, in a product configuration for a vehicle, a modeler can design a state for selection of interior options. The interior options can include a stereo system, power windows, and an interior color. The modeler can define a stereo system option (with yes/no as the choices), a power windows option (with yes/no as the choices), and an interior color option (with black/gray/beige as the choices). Each one of the defined options can be a dropdown list. The modeler can also include 3 buttons on this state: next page, previous page, and stereo options. By pressing the next page button or the previous page button, the customer can navigate to the next screen or the previous screen designed to come before or after the current screen (corresponding to the interior options state). By pressing the stereo options button, the customer can navigate to a sub-screen to select more specific options pertaining to the stereo system.

FIG. 1 illustrates an example embodiment of defining in an authoring environment a state corresponding to a product configuration screen including various options. When selecting to define a new state, for example, by pressing a "New State" button in the authoring environment, or when selecting a previously defined state, for example for editing, the system, in an example embodiment, displays a graphical object corresponding to the new or selected state. For example, FIG. 1 shows a circle or bubble for representing an "Interior Features" state. In this example, the modeler is designing a screen for customizing the interior features of a vehicle. The modeler can define a title for the state 1. For example, the title can be "Interior Features." Subsequently, the modeler can choose options to be displayed on this screen by selecting and dragging from a list of previously defined options and dropping the selected options into the representation of the defined state. For example, the modeler can choose a sunroof, a navigation system, and a sound system for options 2.

In an example embodiment, the authoring environment provides for the modeler to define a sequence of transitions between defined states, including definition of a starting state. The starting state is the state corresponding to the first screen which will be displayed to the customer for customizing the product. For example for customizing a vehicle, the starting screen can be the screen which offers the exterior options for the vehicle, in which screen the customer selects the color (and other exterior features) which the customer desires. The customer will be asked to select other options pertaining to the vehicle in subsequent screens displayed after the starting screen. In the authoring environment, the representation of the state corresponding to the starting screen can have a distinguishable layout compared to other screens or sub-screens.

FIG. 2 illustrates an example embodiment of designing a product configuration model including a starting state and various options. The features represented in this drawing are identical to the features represented in FIG. 1. However, the outline of the state representation for state 1 is dashed in this embodiment, to indicate that the state corresponds to a starting state.

The modeler can define various sub-states corresponding to various sub-screens in the product configuration user interface. A sub-screen can be used to inquire about the customer's detailed preferences pertaining to selection of a particular choice of an option in a previous screen. Depending on the customer's selection on a screen, the customer can be asked to select more options in a sub-screen. For example, if the customer chooses to have a sound system in the customer's vehicle, the customer can be offered to choose specifics of the sound system in a sub-screen. The customer can be asked about the number of speakers the customer desires to include in the vehicle in a sub-screen. These options which branch from customer's selection of the sound system option can be displayed in a sub-screen.

Sub-screens can also be used to inquire about the customers preferences for elective options irrespective of the customer's prior selections. For example, when customizing the interior of a vehicle, a customer can be offered the option to select a color for the vehicle's seats and dashboard. These options do not have to appear on the screen pertaining to the interior options as not all of the customers care to make particular selections for those options. Thus, the modeler can design a sub-screen for these elective features and a button titled "more features" can be included to navigate the customer to this sub-screen. If the customer desires to select these choices, the customer can visit the sub-screen by pressing the "more features" button and select these choices in the sub-screen. Alternatively, the customer can continue selecting interior options without selecting these two options.

FIG. 3 illustrates an example embodiment of designing a product configuration sub-state including various options. In this product configuration sub-state, the modeler is designing a sub-screen for customizing the advanced sound system features of a vehicle. This sub-screen will be presented to a customer only if the customer has selected the choice to have a sound system in the customer's vehicle. The modeler can define a title for the sub-screen 3. For example, the title can be "Advanced Sound System Options." Subsequently, the modeler can choose options to be displayed on this sub-screen. For example, the modeler can choose subwoofer and number of speakers to be presented for options 4. The outline of the representation of the state corresponding to sub-screen 3 is dotted in this embodiment to indicate its correspondence to a sub-screen.

A modeler can include overview options on a screen, i.e., display of choices which are previously selected by the customer, in order to remind the customer of the customer's prior selection, which can be useful to the customer as a context to determine what other options to select. For example, if a customer is customizing a vehicle and has already selected the color and design of the bumpers, it can be helpful to include this information on a screen which presents various choices about rim colors to the customer. The overview options can be presented in a separate callable screen, in a banner that can be overlaid on other option selection screens, or embedded in other option selection screens.

FIG. 4 illustrates an example embodiment of designing a product configuration sub-state including various options and an overview option. FIG. 4 is similar to FIG. 3. In addition to all of the features of FIG. 3, in FIG. 4, the modeler designs the sub-screen with overview options 5. As a result, when the customer is presented with the sub-screen corresponding to this state, the customer can see the customer's selection on the previous screen regarding the sound system option (which must have been yes for the customer to have navigated to this screen).

The modeler can define transition rules for transitioning between states, corresponding to a navigation sequence between various screens and sub-screens. In an example embodiment, a transition rule defines a source state, a target state, one or more triggers, one or more operators (e.g., when there are multiple triggers), a mode of transition, and/or a priority. The modeler can define transition rules in the authoring environment.

A source state (corresponding to a source screen) is a state (or sub-state) on which the transition rule can be evaluated for activation, where if defined conditions are met, the transition rule can be activated for responsive display of a target screen (or sub-screen) corresponding to the target state of the transition rule.

For example, a modeler designing a service configuration for a cell phone contract can design a screen for the customer to select a cell phone device. The modeler can also design a screen for selecting choices pertaining to the wireless service. The modeler can include a transition rule between the device selection screen and the service selection screen, where the device selection screen is the source screen and the service selection screen is the target screen.

A trigger is a condition defined for an option. If the condition is met, the trigger is activated and if the condition is not met, the trigger is inactive. A non-exhaustive list of exemplary conditions will be discussed below.

A condition can be defined to evaluate whether an option has a particular value, e.g., the exterior color of a vehicle is selected as red. A condition can be defined based on whether a value has been selected or entered for an option, e.g., whether the exterior color of the vehicle has been selected. A condition can be set to determine whether an option has been selected to include a permissible value, e.g., if the exterior color of red is currently unavailable for the vehicle, selection of red is not permissible and does not activate the trigger. A condition can be defined to evaluate if a configuration is complete (i.e., all of the options that require to have a value have been selected to have a value), e.g., whether all of the customizable features associated with the vehicle have been selected.

A condition can be defined to evaluate if the values selected for some or all of the options are consistent. A modeler can define various rules regarding compatibility of options. If any of such rules, or sub-set of rules, are violated, the condition will not activate the trigger. For example, if a red vehicle with a blue bumper cannot be produced, then a modeler can define a rule to make selection of red for the exterior color and blue for bumper color inconsistent.

An operator is a logical connective which connects the triggers and can be a conjunctive connective or a disjunctive connective. For example, a transition rule can have three triggers and two operators. The triggers can be selection of option 1, selection of option 2, and selection of option 3. The operators can be conjunctive so that all three options must be selected to activate the transition rule, disjunctive so that at least one of the three options must be selected to activate the transition rule, or a combination thereof, e.g., at least one predefined pair of one or more possible pairs of constructed from options 1-3 must be selected to activate the transition rule.

Figure 5:
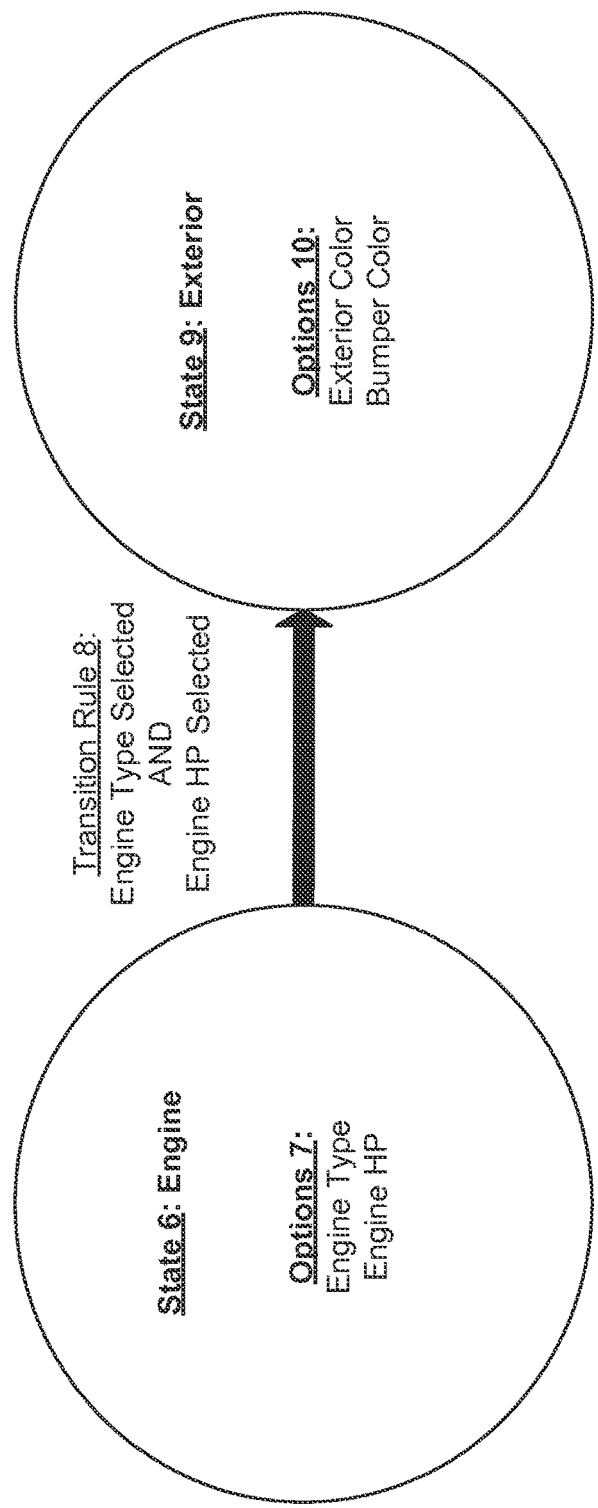
FIG. 5 illustrates an example embodiment of a product configuration transition rule defined between two states.

FIG. 5 illustrates an example embodiment of a product configuration transition rule defined between two states corresponding to respective screens. A modeler can define a state 6 for configuring options 7 pertaining to an engine of a vehicle. The options which can be customized on this screen are an engine type and an engine horsepower. The modeler can also define a state 9 for configuring options 10 pertaining to the exterior of the vehicle. The options to be configured on this screen are an exterior color and a bumper color. The modeler can design these two screens to appear consecutively in the product configuration. Thus, the modeler can design a transition rule 8 between state 6, as the source state, and state 9, as the target state. The first trigger can be selection of the engine type. The second trigger can be selection of the engine horsepower. The operator can be a conjunctive operator. Therefore, when the customer selects a choice for the engine type and a choice for the engine horsepower, the transition rule 8 is activated and navigates the customer from the source state 6 to the target state 9.

Figure 6:
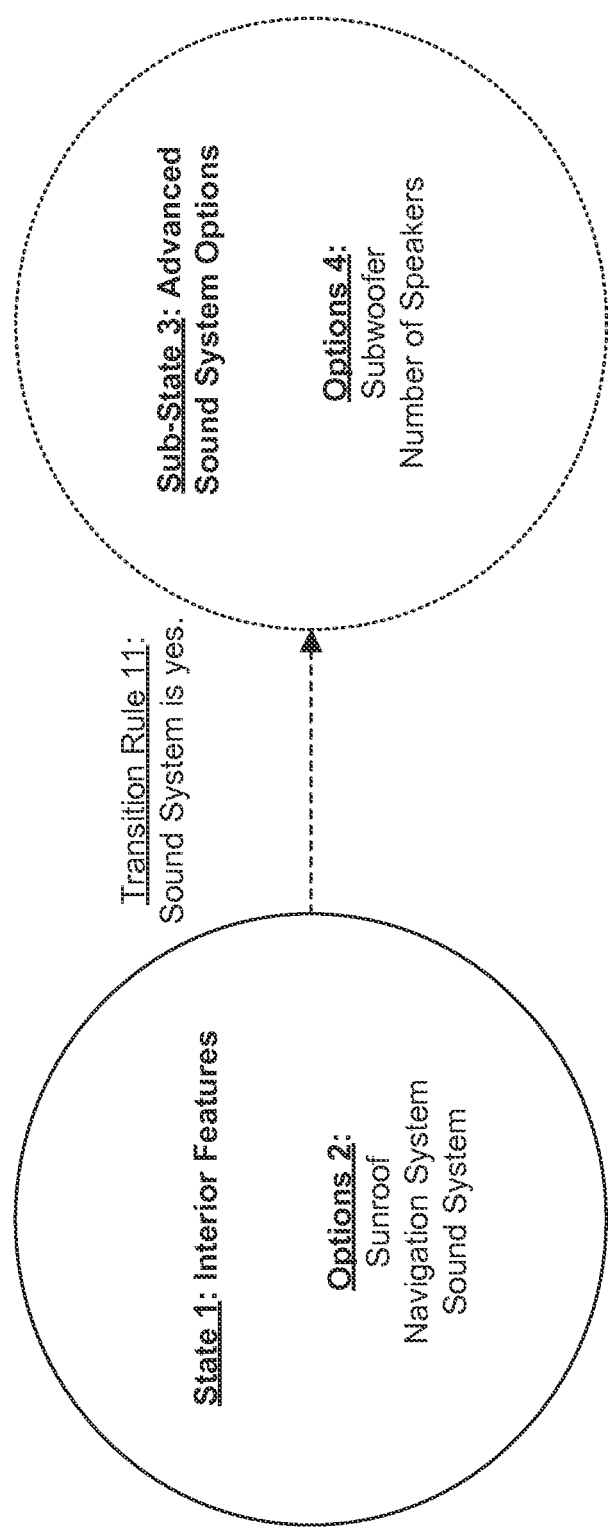
FIG. 6 illustrates an example embodiment of a product configuration transition rule between a state and a sub-state.

FIG. 6 illustrates an example embodiment of a product configuration transition rule for transitioning between a state and a sub-state. A modeler can define a state 1 for configuring options 2 pertaining to interior features of a vehicle. The options which can be customized on this screen are a sunroof, a navigation system, and a sound system. The modeler can also define a sub-state 3 for configuring options 4 pertaining to the sound system. The options to be configured on this state are a subwoofer and a number of speakers. The modeler can design the advanced sound system options sub-state 3 to appear after the interior features state 1 only if the sound system choice selected is yes in state 1. Thus, the modeler can design a transition rule 11 between state 1, as the source state, and sub-state 3, as the target sub-state. The trigger can be activated when the sound system choice is selected as yes. No operator is needed here because there is only one trigger. Therefore, when the customer selects to have a sound system on the vehicle, the transition rule 11 is activated and navigates the customer from the source state 1 to the target sub-state 3.

Usually, when a user visits a target sub-screen, after making the user's selections, the user intends to return to the source screen from which the user was navigated to the sub-screen. Therefore, by default, there is a transition rule between the target sub-state and the source state to navigate the user back to the source state after making the user's selections. For example, this transition rule can be in immediate mode, and the triggers can include selection of all of the options included on the sub-state. The modeler can navigated the user to other sub-states or sub-sub-states instead of the source state, but in the end the user has to be navigated back to the source state. For example, after visiting sub-screen A, another sub-screen B can follow sub-screen A for further questions. The modeler can define a transition rule from sub-state A to Sub-state B. Nonetheless, the user has to be navigated from sub-state B to the source state. Again, this transition rule will be assumed by default.

Figure 7:
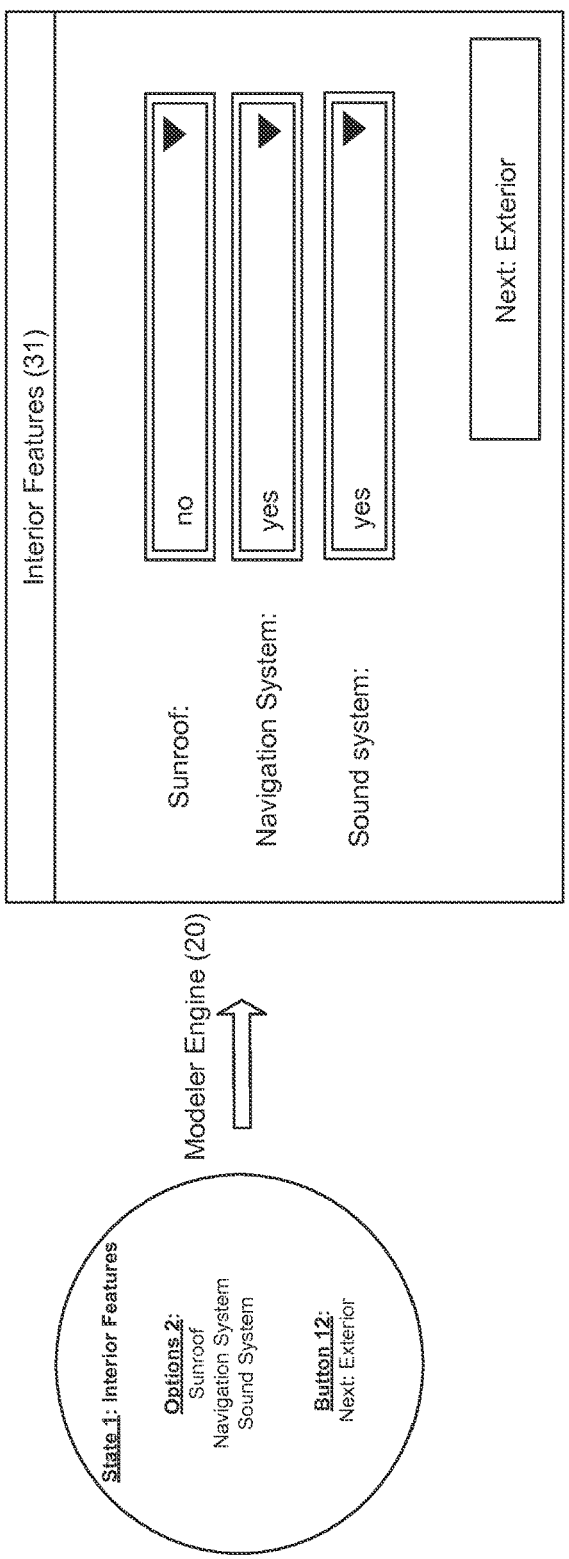
FIG. 7 illustrates an example embodiment of a product configuration model and the resulting product configuration user interface generated by a modeler engine.

In an example embodiment, the system includes a modeler engine that converts a product configuration model designed by the modeler into a product configuration usable by customers (i.e., user interface). FIG. 7 illustrates an example embodiment of a product configuration model and the resulting product configuration user interface generated by a modeler engine 20. The product being configured here is a vehicle. State 1 is a state defined by the modeler for displaying the interior features for the vehicle. Options 2 defined for this state are a sunroof (with yes/no as the choices), a navigation system (with yes/no as the choices), and a sound system (with yes/no as the choices). The option types can be, for example, dropdown lists. The modeler can also define a button 12 titled "Next: Exterior" for this state. FIG. 7 shows a screen 31 generated by the modeler engine 20 corresponding to State 1.

In an example embodiment, a modeler can, in the authoring environment, define a transition between a state (or sub-state) and another state (or sub-state) to be in one of two modes: immediate mode and passive mode. In the immediate mode, every time a selection is made on the corresponding screen, the system checks all of the transition rules defined for the state, and if a transition rule is satisfied, the transition will be activated automatically on the screen.

Figure 8:
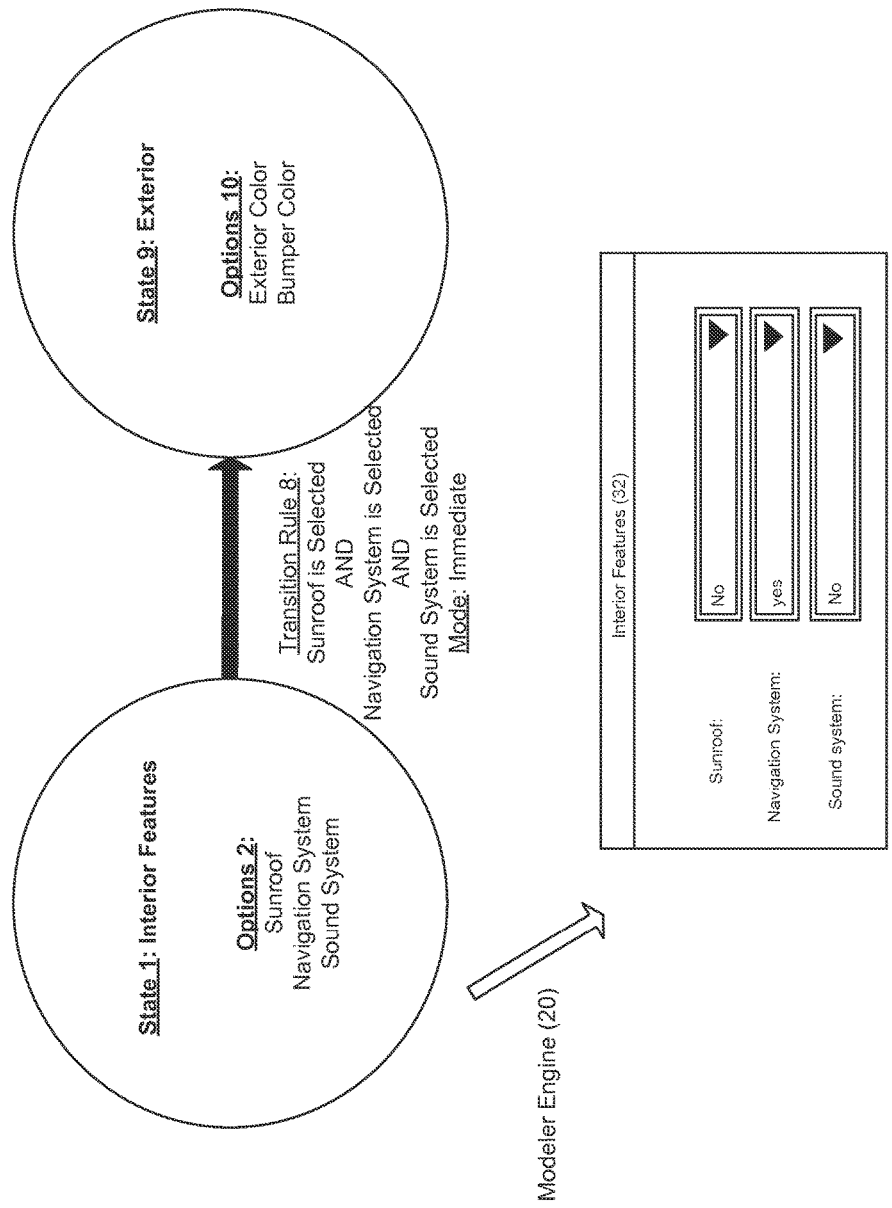
FIG. 8 illustrates an example embodiment of a product configuration transition rule defined in the immediate mode and the resulting product configuration generated by the modeler engine.

FIG. 8 illustrates an example embodiment of a product configuration transition rule defined in the immediate mode and the resulting product configuration generated by the modeler engine. The product being configured here is a vehicle. State 1 displays the interior features for the vehicle. The options 2 defined for this state are a sunroof (with yes/no as the choices), a navigation system (with yes/no as the choices), and a sound system (with yes/no as the choices). The option types can be dropdown lists. The modeler can define a transition rule 8 for this state to navigate the customer from state 1 to the exterior state 9 for the exterior configuration. The transition rule 8 can have the options (sunroof, navigation system, and sound system) as triggers for the rule and can provide for the triggers to become active if the option choices are selected. The transition rule can connect the triggers using conjunctive operators. The transition rule is defined in the immediate mode so that after selection of the last option choice on the corresponding screen, satisfying all of the triggers, the transition rule 8 is automatically activated and the customer is navigated to the exterior equipment state 9 for which the modeler engine 20 has generated the corresponding screen 32.

In the passive mode, however, the customer has to actively effectuate the transition by pressing a button, responsive to which the system transitions to the next screen if the defined transition rule is satisfied.

Figure 9:
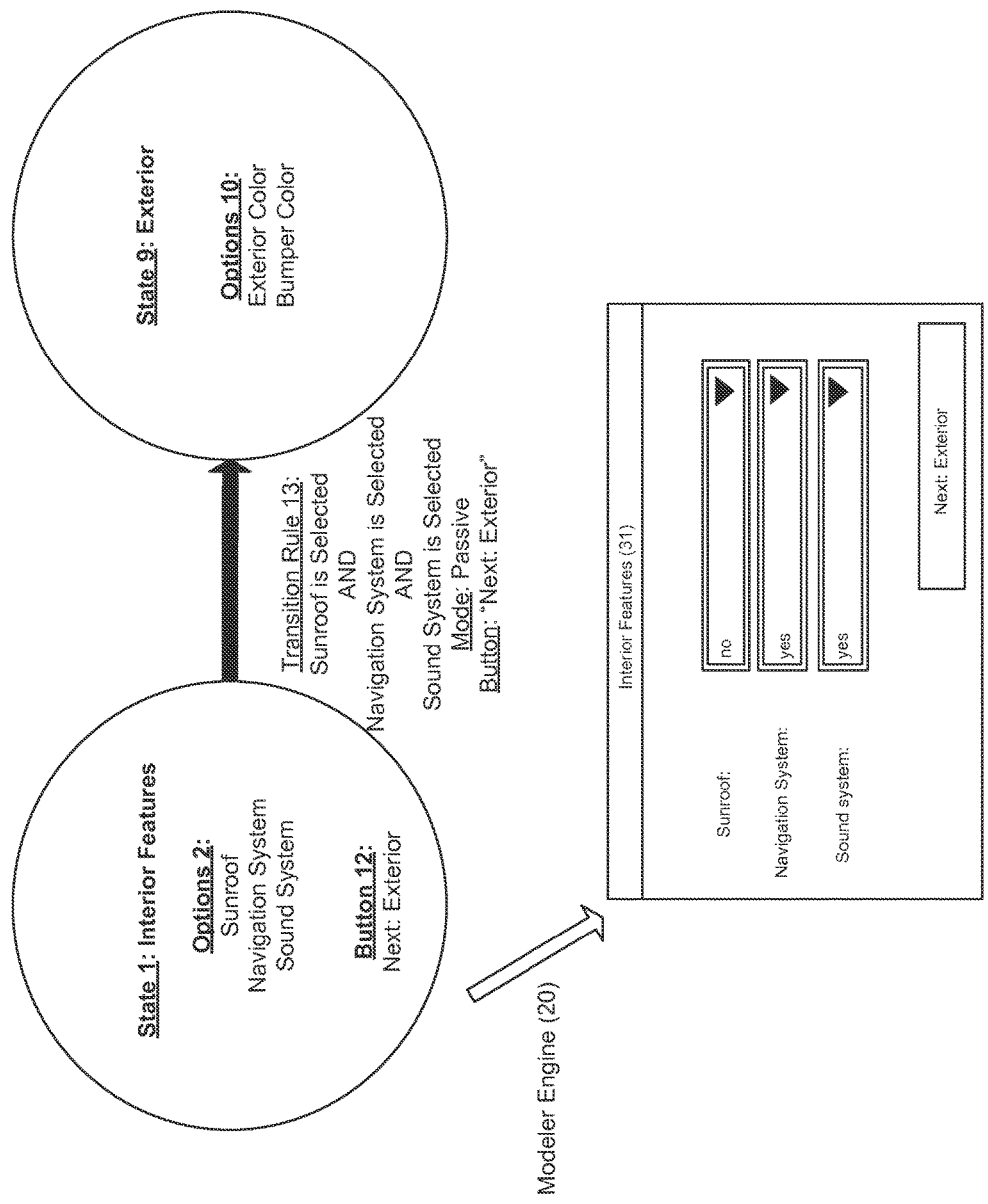
FIG. 9 illustrates an example embodiment of a product configuration model in the passive mode and the resulting product configuration user interface generated by the modeler engine.

FIG. 9 illustrates an example embodiment of a product configuration model in the passive mode and the resulting product configuration user interface generated by the modeler engine. This product configuration model is similar to the product configuration model in FIG. 8; however, in this embodiment, the modeler can define a button 12 titled "Next: Exterior" in state 1. The modeler can also define a transition rule 13 in the passive mode which can trigger a transition to a next state and corresponding screen (if all necessary conditions of the transition rule 13 are satisfied) in response to pressing of button 12. In this embodiment, the customer selects the customer's desired choices for interior features. Unlike in the immediate mode, upon selection of the choices, transition rule 13 does not trigger a state transition. Once the customer presses the "Next: Exterior" button 12, if all necessary conditions defined by transition rule 13 are satisfied, the transition rule 13 triggers navigation to the exterior state 9.

In an example embodiment, a modeler can define in the authoring environment activation properties of buttons, defining when a button is in an active state in which the button can be pressed (and/or made visible or not greyed out) and defining when the button cannot be pressed (and/or not visible or greyed out). A button is in an active state when it can be pressed by the customer, and is in an inactive state when it is greyed out or not visible and cannot be pressed by the customer. The modeler can define an activation rule for each button. The button activation rules are similar to transition rules; however, when a button activation rule is satisfied, the rule activates the button to be in a selectable state. Button activation rules are always in the immediate mode.

Figure 10:
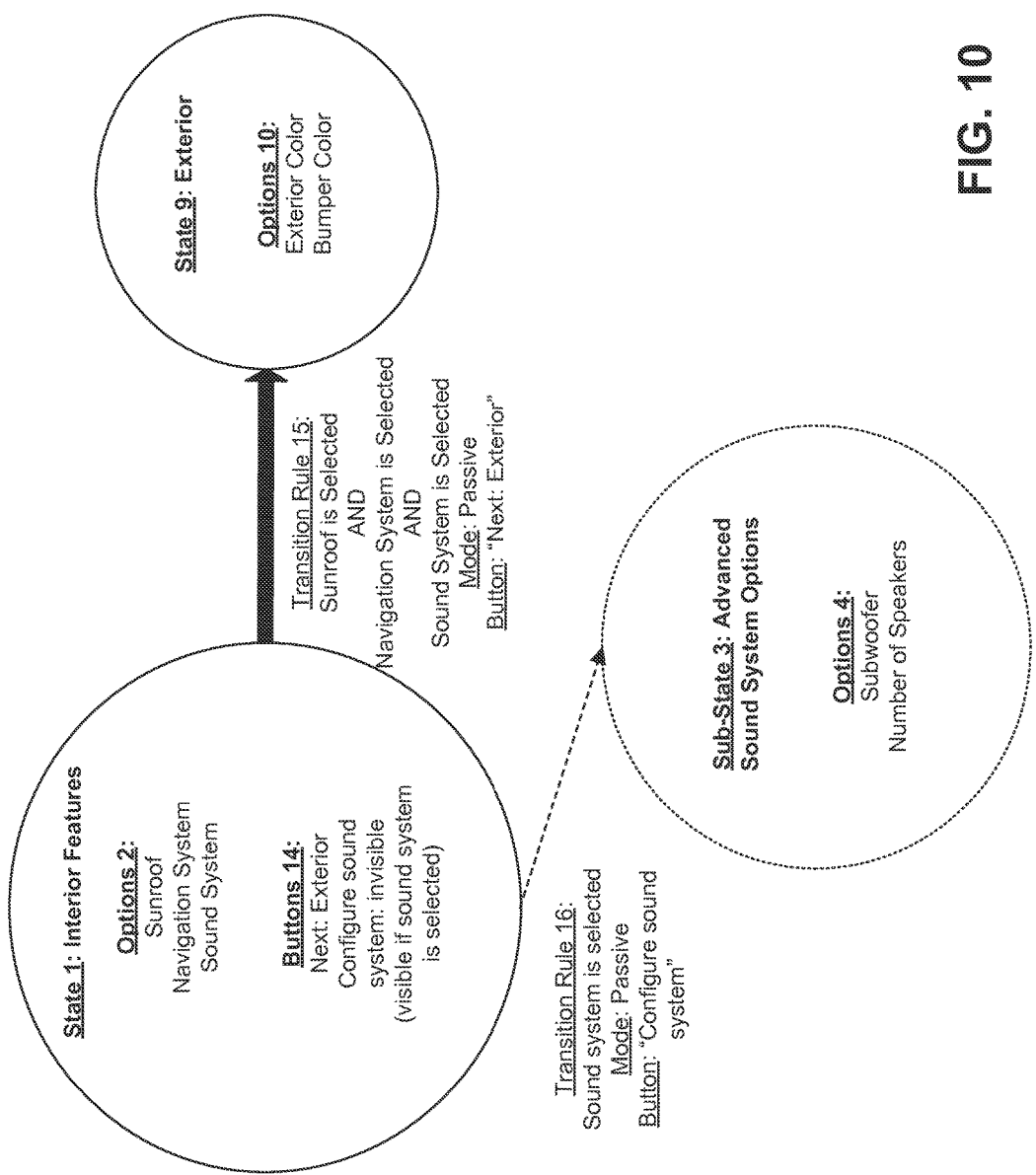
FIG. 10 illustrates a product configuration model including a visible and an invisible button according to an example embodiment.

FIG. 10 illustrates a product configuration model including a button for which a conditional button activation rule has been set and a button for which no conditional button activation rule has been set. State 1 displays the interior features for a vehicle. The options 2 defined for this state are a sunroof (with yes/no as the choices), a navigation system (with yes/no as the choices), and a sound system (with yes/no as the choices). The option types can be dropdown lists, for example. State 1 has two buttons 14: "Next: Exterior" and "Configure sound system." "Next: Exterior" button is visible and active by default. "Configure sound system" button on the other hand, is defined as becoming active according to a condition set by a button activation rule. The trigger can for example be selecting "yes" for the sound system option. Because button activation rules are defined in immediate mode, once the customer selects "yes" for the sound system choice, the button activation rule triggers the button to be placed into an active state, e.g., it may not have been visible prior to the trigger, but becomes visible by the triggering. Once the button is visible or otherwise active, the customer can press the button.

The modeler can define a transition rule 15 to navigate the customer from state 1 to state 9 for the exterior configuration. The transition rule 15 can have the triggers selecting sunroof, selecting navigation system, and selecting sound system. The operators can be conjunctive. Transition rule 15 is defined in the passive mode and the rule checks the triggers only when "Next: Exterior" button is pressed. After selection of all of the option choices on the corresponding screen of state 1 and pressing "Next: Exterior," the triggers are checked. If all triggers are selected, the transition rule 15 triggers navigation to the screen corresponding to the exterior state 9.

The modeler can also define a second transition rule 16 initiating on state 1 for navigating the customer to sub-state 3 as the target sub-state. Transition rule 16 can be defined in passive mode and can have a "Configure sound system" button for activating a check as to whether the sound system option is selected. Once the sound system choice is selected as "yes," the "Configure sound system" button becomes visible, and the customer can press the button, responsive to which, because sound system is selected, the customer can be navigated to sub-state 3 to configure advanced sound system options.

Figure 11:
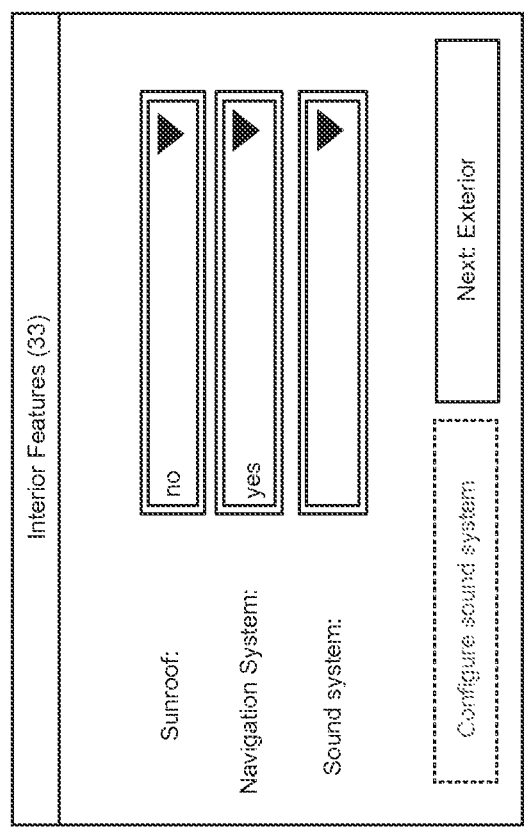
FIG. 11 illustrates an embodiment of the product configuration user interface corresponding to FIG. 10's product configuration model.

FIG. 11 illustrates an example product configuration screen 33 modeled in FIG. 10 and generated by the modeler engine. In this snapshot, the choice for sound system is not selected by the customer. As a result, "Configure sound system" button remains invisible.

A modeler can define a priority for each transition rule of the immediate mode. Multiple transition rules can be defined for a state for transitioning from the state to respective other states or sub-states. Thus, conflicts between transition rules can ensue if the conditions for more than one transition rule are satisfied at the same time. As a result, a modeler can assign a priority to each transition rule to avoid such conflicts. Priority provides the modeler with a means to rank various transition rules so that when conditions of multiple transition rules are satisfied, the system follows whichever of the transitions corresponds to the highest ranking one of the rules whose conditions have been satisfied.

Figure 12:
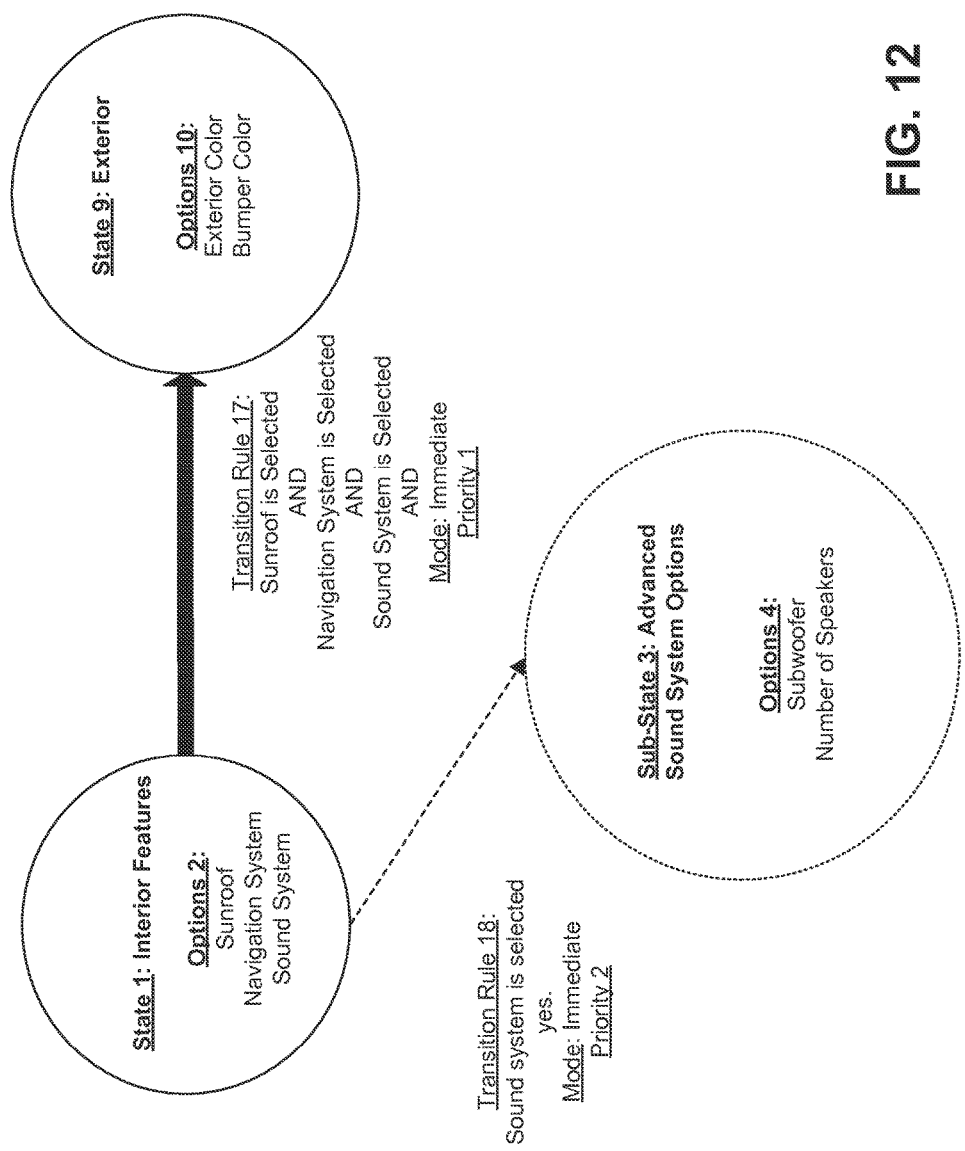
FIG. 12 illustrates an embodiment of a product configuration with multiple ranked transition rules.

FIG. 12 illustrates an embodiment of a product configuration with multiple ranked transition rules. A modeler can define an immediate transition rule 17 between state 1 and state 9. This transition rule can be activated if all three options 2 are selected. The modeler sets the priority for this rule as 1. The modeler can also define an immediate transition rule 18 between state 1 and sub-state 3. This transition rule can be activated if the sound system choice is selected as yes. The modeler sets the priority for this rule as 2. If a customer selects the options for sunroof, navigation system, and sound system (as yes), when the sound system option is selected, the conditions for both of the transition rules 17 and 18 are satisfied. However, because transition rule 17 is ranked higher than transition rule 18, the system gives effect only to transition rule 17, and thus, the customer is navigated to the corresponding screen associated with exterior state 9.

Figure 13:
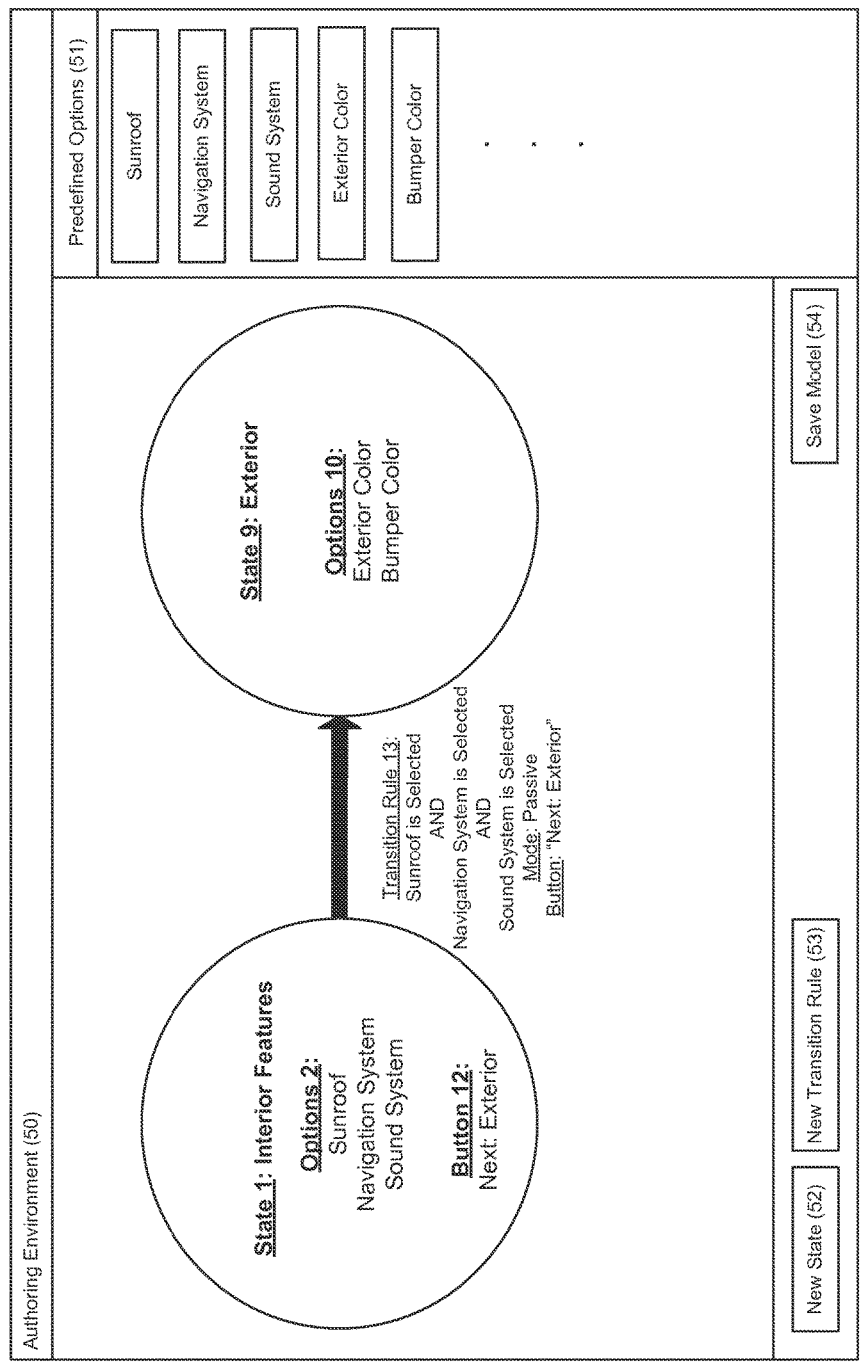
FIG. 13 illustrates an example embodiment of an authoring environment.

FIG. 13 illustrates an example embodiment of an authoring environment. The authoring environment 50, has a column to display predefined options 51. For example, predefined options 51 can include a sunroof, navigation system, sound system, exterior color, and bumper color, for example, previously defined by the modeler using a different interface of the authoring environment. The option features discussed in this figure are similar to those of FIG. 9. The authoring environment 50 can also include several buttons such as a "New State" button 52, a "New Transition Rule" button 53 and a "Generate User Interface" button 54. After defining various options (i.e., predefined options), a modeler can create a product configuration model by authoring a new state. In the authoring environment 50, the modeler can press the "New State" button 52. Upon pressing the button, in an example embodiment, the modeler is prompted to define the state characteristics, e.g., whether the state is a starting state, whether the state is a sub-state, whether the state includes any buttons, which options should be included in the state, name of the state, etc. Subsequently, a circle state 1 including the defined characteristics will be displayed in the authoring environment 50. In an alternative example embodiment, upon pressing the button, an empty circle state 1, i.e., an empty graphical representation of a new state, is presented in the authoring environment 50, which state the modeler can subsequently populate with selected characteristics, such as the options to be included, e.g., via drag-and-drop from the predefined options 51 section of the interface, thereby associating those selected options 51 with the state and corresponding screen to be generated based on the defined states. Subsequently, the modeler can enter the name of the state in the circle.

When the modeler has defined a plurality of states, the modeler can define a transition rule between two of the plurality of states. For example, in an embodiment, upon pressing the "New Transition Rule" button 53, the modeler will be prompted to define the source state, target state, triggers, and operators for the transition rule. For example, in an example embodiment, the modeler can interact with the authoring environment interface to add arrows between states to define a transition between states, and the sequence of the transition, with one of the states being the source state and one of the states being the target state, and can define the characteristics of the transition rule. The authoring environment displays the arrow between the source state and the target state, and displays defined triggers and operators. In example embodiment, the modeler can write or drag various triggers and operators into the transition rule.

After defining various states and transition rules between the states, the modeler can save the generated model by pressing the "Save Model" button 54. Subsequently, when the user accesses the website for configuring a product, the user interface will be generated based on the saved model.

In an example embodiment, the modeler can develop multiple product configuration models for a given product so that each user device which accesses the user interface of the product configuration displays differing screens or options. Different user devices can have different display capabilities. For example, a cell phone can display fewer options per screen than a personal computer. Thus, it is advantageous to define and provide multiple product configuration user interfaces based on the displaying capability of the user accessing device. In an example embodiment, a modeler can customize each product configuration model for a particular product in a way that the product configuration user interface is displayed appropriately given the accessing device's display capabilities. For example, the modeler can design a model for personal computers and a separate model for cell phone devices. Since cell phone devices include smaller displays, each state can include fewer options. Some options can be included in the personal computer model, but would be left out for the cell phone model. Additionally, the personal computer model can include fewer states because each screen can include more options, but the cell phone model can include more states because each screen can display fewer options. As a result, access to the user interface can be tailored for each device or class of devices.

Product and service are interchangeable in the context of this application. Thus, any features described for a product can be applied to a service as well and vice versa. Similarly, the terms customer and user are interchangeable in this document. A user-interactable interface is an interface with which the customers can interact.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

The above description is intended to be illustrative, and not restrictive, and although the above description provides details for purposes of clarity of understanding, it will be apparent that certain changes and modifications may be practiced within the scope of the following claims. The invention is not to be limited to the details given herein, but may be modified within the scope and equivalents of the following claims. For example, those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims. For example, the present invention may be practiced according to the claims without some or all of these specific details. For the purpose of clarity, technical material that is known in the technical fields related to the invention has not been described in detail so that the present invention is not unnecessarily obscured.

What is claimed is:

1. A method for generating product configurations, the method comprising:
    storing a plurality of option structures defined by a user;
    outputting, by a computer processor, in an authoring environment respective representations of the stored plurality of option structures,
    wherein:
        the authoring environment is user-interactable for:
            input by the user of an instruction in response to which the processor is configured to generate a plurality of state structures and display respective visual representations of the generated state structures;
            respective selection and dragging by the user of the representations of the plurality of option structures into respective ones of the displayed visual representations of the generated state structures, for respective associations between the option structures and the respective state structures into which they were dragged; and
            definition by the user of transition rules between the state structures, in response to which definition the processor displays respective edges between the visual representations of the generated states connected by the respective transition rules, wherein each transition rule defines a source state, a target state, one or more triggers, one or more operators, a mode of transition, and a priority, wherein the source state is a state or sub-state on which the transition rule can be evaluated for activation, where if defined conditions are met, the transition rule can be activated for a responsive display of a target screen or sub-screen corresponding to the defined target state of the transition rule, wherein each trigger is a condition defined for an option, each operator being a logical connective which connects the triggers;
    based on the state structures, the respective options associated with the state structures, and the defined transition rules, a product configuration user interface is generatable, which product configuration user interface includes a plurality of display screens that (a) correspond to respective ones of the state structures, (b) display respective sets of options corresponding to the respective option structures with which the corresponding state structures have been associated, and (c) are displayed in a sequence dictated by the defined transition rules,
    when conditions are satisfied for multiple transition rules creating a conflict amongst such multiple transition rules, such transition rules are ranked according to their priority defined in such rule and a mode of transition corresponding to and defined by only the top ranked transition rule is executed.

2. The method of claim 1, further comprising outputting the product configuration user interface.

3. The method of claim 1, wherein the authoring environment is configured for the user to define each option structure as being one of a plurality of predefined types, the plurality of predefined types including at least one of a text box, radio buttons, dropdown list, checkbox, and calendar field.

4. The method of claim 1, wherein one and only one of the state structures is a starting state structure and the product configuration user interface displays the screen associated with the starting state structure before display of any screen associated with any of the other state structures.

5. The method of claim 1, wherein the authoring environment is user-interactable for input by the user of an instruction in response to which the processor is configured to generate a plurality of sub-state structures and display respective visual representations of the generated sub-state structures.

6. The method of claim 1, wherein at least one of the state structures includes an overview options which in the product configuration user interface displays the user's previously selected option choices on the at least one of the state structures and the sub-state structures.

7. The method of claim 1, wherein at least one of the state structures define a button for navigating from a screen corresponding to the state structure to another state structure.

8. The method of claim 7, wherein the button is defined to be invisible button, which can become visible upon satisfaction of a defined condition.

9. A non-transitory computer readable medium storing instructions that are executable by a processor and that, when executed by the processor, cause the processor to perform a method comprising:
  storing a plurality of option structures defined by a user;
  outputting, by a computer processor, in an authoring environment respective representations of the stored plurality of option structures, wherein:
    the authoring environment is user-interactable for:
      input by the user of an instruction in response to which the processor is configured to generate a plurality of state structures and display respective visual representations of the generated state structures;
      respective selection and dragging by the user of the representations of the plurality of option structures into respective ones of the displayed visual representations of the generated state structures, for respective associations between the option structures and the respective state structures into which they were dragged; and
      definition by the user of transition rules between the state structures, in response to which definition the processor displays respective edges between the visual representations of the generated states connected by the respective transition rules, wherein each transition rule defines a source state, a target state, one or more triggers, one or more operators, a mode of transition, and a priority, wherein the source state is a state or sub-state on which the transition rule can be evaluated for activation, where if defined conditions are met, the transition rule can be activated for a responsive display of a target screen or sub-screen corresponding to the defined target state of the transition rule, wherein each trigger is a condition defined for an option, each operator being a logical connective which connects the triggers;
  based on the state structures, the respective options associated with the state structures, and the defined transition rules, a product configuration user interface is generatable, which product configuration user interface includes a plurality of display screens that (a) correspond to respective ones of the state structures, (b) display respective sets of options corresponding to the respective option structures with which the corresponding state structures have been associated, and (c) are displayed in a sequence dictated by the defined transition rules;
  when conditions are satisfied for multiple transition rules creating a conflict amongst such multiple transition rules, such transition rules are ranked according to their priority defined in such rule and a mode of transition corresponding to and defined by only the top ranked transition rule is executed.

10. The non-transitory computer readable medium of claim 9, further comprising outputting the product configuration user interface.

11. The non-transitory computer readable medium of claim 9, wherein the authoring environment is configured for the user to define each option structure as being one of a plurality of predefined types, the plurality of predefined types including at least one of a text box, radio buttons, dropdown list, checkbox, and calendar field.

12. The non-transitory computer readable medium of claim 9, wherein one and only one of the state structures is a starting state structure and the product configuration user interface displays the screen associated with the starting state structure before display of any screen associated with any of the other state structures.

13. The non-transitory computer readable medium of claim 9, wherein the authoring environment is user-interactable for input by the user of an instruction in response to which the processor is configured to generate a plurality of sub-state structures and display respective visual representations of the generated sub-state structures.

14. The non-transitory computer readable medium of claim 9, wherein at least one of the state structures includes an overview options which in the product configuration user interface displays the user's previously selected option choices on the at least one of the state structures and the sub-state structures.

15. The non-transitory computer readable medium of claim 9, wherein the authoring environment is user-interactable for selecting between defining the at least one transition rule as either an immediate transition rule, which is activated automatically upon satisfaction of all of the conditions associated with the trigger, or a passive transition rule, which is activated only if a user indicates that the transition rule should evaluate the conditions associated with the triggers.

16. A system for generating product configurations, the system comprising:
  at least one processor; and
  memory storing instructions which, when executed by the at least one processor, result in operations comprising:
    storing a plurality of option structures defined by a user;
    outputting in an authoring environment respective representations of the stored plurality of option structures,
  wherein:
    the authoring environment is user-interactable for:
      input by the user of an instruction in response to which the processor is configured to generate a plurality of state structures and display respective visual representations of the generated state structures;
      respective selection and dragging by the user of the representations of the plurality of option structures into respective ones of the displayed visual representations of the generated state structures, for respective associations between the option structures and the respective state structures into which they were dragged; and definition by the user of transition rules between the state structures, in response to which definition the processor displays respective edges between the visual representations of the generated states connected by the respective transition rules, wherein each transition rule defines a source state, a target state, one or more triggers, one or more operators, a mode of transition, and a priority, wherein the source state is a state or sub-state on which the transition rule can be evaluated for activation, where if defined conditions are met, the transition rule can be activated for a responsive display of a target screen or sub-screen corresponding to the defined target state of the transition rule, wherein each trigger is a condition defined for an option, each operator being a logical connective which connects the triggers;

based on the state structures, the respective options associated with the state structures, and the defined transition rules, a product configuration user interface is generatable, which product configuration user interface includes a plurality of display screens that (a) correspond to respective ones of the state structures, (b) display respective sets of options corresponding to the respective option structures with which the corresponding state structures have been associated, and (c) are displayed in a sequence dictated by the defined transition rules, when conditions are satisfied for multiple transition rules creating a conflict amongst such multiple transition rules, such transition rules are ranked according to their priority defined in such rule and a mode of transition corresponding to and defined by only the top ranked transition rule is executed.

17. The system of claim 16, wherein the operations further comprise: outputting the product configuration user interface.

18. The system of claim 16, wherein the authoring environment is configured for the user to define each option structure as being one of a plurality of predefined types, the plurality of predefined types including at least one of a text box, radio buttons, dropdown list, checkbox, and calendar field.

19. The system of claim 16, wherein one and only one of the state structures is a starting state structure and the product configuration user interface displays the screen associated with the starting state structure before display of any screen associated with any of the other state structures.

20. The system of claim 16, wherein the authoring environment is user-interactable for input by the user of an instruction in response to which the processor is configured to generate a plurality of sub-state structures and display respective visual representations of the generated sub-state structures.

* * * * *